(12) United States Patent
Nakamura et al.

(10) Patent No.: US 6,288,997 B1
(45) Date of Patent: *Sep. 11, 2001

(54) PHASE CHANGE OPTICAL DISK MEDIUM

(75) Inventors: Shigeru Nakamura, Tachikawa; Tetsuya Nishida, Tokyo; Makoto Miyamoto, Ome, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,634

(22) Filed: Sep. 7, 1999

Related U.S. Application Data

(63) Continuation of application No. 09/135,174, filed on Aug. 18, 1998, now Pat. No. 6,014,363.

(30) Foreign Application Priority Data

Aug. 25, 1997 (JP) .................................................. 9-227727

(51) Int. Cl.$^7$ ....................................................... G11B 7/24
(52) U.S. Cl. ................. 369/275.2; 428/64.4; 430/270.13
(58) Field of Search .............................. 369/275.1, 275.4, 369/275.2, 284, 280; 430/270.13, 320, 321; 428/64.4, 64.1

(56) References Cited

U.S. PATENT DOCUMENTS

| | | |
|---|---|---|
| 5,187,052 | 2/1993 | Maeda et al. . |
| 5,479,382 | 12/1995 | Nishida et al. . |
| 5,537,373 | 7/1996 | Horikiri . |
| 5,650,992 | 7/1997 | Ohkubo . |
| 5,745,475 | 4/1998 | Ohno et al. . |
| 6,016,302 * | 1/2000 | Yamatsu et al. ................... 369/275.4 |
| 6,040,030 * | 3/2000 | Utsunomiya et al. ............... 428/64.1 |
| 6,046,968 * | 4/2000 | Abramovitch et al. ................. 369/47 |
| 6,091,700 * | 7/2000 | Kobayashi et al. ............... 369/275.4 |

FOREIGN PATENT DOCUMENTS

| | | |
|---|---|---|
| 0 626 679 | 11/1994 | (EP) . |
| 0 737 967 | 10/1996 | (EP) . |
| 0 874 362 | 10/1998 | (EP) . |
| 6-223403 | 8/1994 | (JP) . |
| 7-182693 | 7/1995 | (JP) . |
| 9-081967 | 3/1997 | (JP) . |

OTHER PUBLICATIONS

Standard ECMA–272, Standardizing Information and Communication Systems, 120 mm DVD Rewritable Disk (DVD–RAM), Feb. 1998.

DVD Specifications for Rewritable Disc (DVD–RAM) Version 1.0, Jul. 1997.

* cited by examiner

*Primary Examiner*—Tan Dinh
(74) *Attorney, Agent, or Firm*—Mattingly, Stanger & Malur, P.C.

(57) ABSTRACT

A phase change optical disk medium includes a disklike substrate, and a recording layer formed by a laminate of a plurality of thin layers including a phase change layer. Information marks are recorded on the phase change layer by phase changes from a crystal phase to an amorphous phase and vice versa. The recording layer has tracks for recording information marks formed by groove portions and land portions respectively taking alternate concave and convex shapes. The track has an interval in range of 0.54 to 0.64 $\mu$m and the recording layer has a ratio of the optical reflectance of 0.35 or less when the phase change layer has changed to the amorphous phase in case where the optical reflectance of the recording layer is 1 when the phase change layer is in the crystal phase.

20 Claims, 2 Drawing Sheets

REPRODUCED SIGNAL AMPLITUDE OF 3T MARK

DEPENDENCE OF REFLECTANCE UPON LOWER INTERFERENCE LAYER

PHASE CHANGE OPTICAL DISK MEDIUM

This is a continuation of U.S. Ser. No. 09/135,174, filed Aug. 18, 1998 and now is U.S. Pat. No. 6,014,363.

CROSS REFERENCE TO RELATED APPLICATIONS

This application relates to (1) U.S. patent application Ser. No. 08/621,881 filed Mar. 26, 1996, entitled "Information Recording Medium and Information Memory Apparatus" by A. Hirotsune et al. (2) U.S. patent application Ser. No. 08/978,043 filed Nov. 25, 1997, entitled "Information Recording Medium and Information Recording and Reproducing Apparatus Using the Same" by M. Miyamoto et al., the disclosure of which are incorporated herein by reference.

BACKGROUND OF THE INVENTION

The present invention relates to an optical disk medium for optically recording and reproducing information by using an optical disk device, and in particular to a phase change optical disk medium for recording information with a high density by using phase changes of a thin layer for recording information from its crystal phase to its amorphous phase and reproducing the information.

With development of the computer technology, it has become possible to process audio data and moving picture data by using a personal computer, besides text data processed conventionally. Large-capacity information storage devices capable of coping with various kinds of information media have become necessary. As an optical disk satisfying such a demand, there is a DVD (Digital Video Disk). A DVD-ROM dedicated for reproduction having a user capacity of 4.7 GB/surface has already been put into production. A rewritable DVD-RAM is also under development. As a draft of specifications of optical disks for DVD-RAM, "DVD Specifications for Rewritable Disc (DVD-RAM) Version 1.0; July 1997" is open to the public.

According to the draft of specifications of optical disks for DVD-RAM, a phase change recording layer on which information marks are recorded by phase changes from the crystal phase to the amorphous phase and vice versa is used as an information recording layer, with a capacity of 2.6 GB/surface, a track pitch of 0.74 $\mu$m, and a minimum mark length of 0.614 $\mu$m. Its track structure takes a shape of concave portions that alternate with convex portions. Each groove has a width nearly equal to that of each land portion. Using both groove and land portions as tracks, information marks can be recorded. In addition, cross-talk from adjacent tracks can be canceled. The so-called land/groove structure is thus adopted.

Furthermore, the draft of specifications of optical disks for DVD-RAM described that a test of disks should be conducted by recording and reproducing with a laser spot obtained by focusing a laser beam having a wavelength of approximately 650 nm by a lens having a numerical aperture of 0.6. A reproduced signal of a 14T mark having a mark length of approximately 2.87 $\mu$m should have an amplitude equivalent to at least 43% of the reproduced signal level of unrecorded portions. A reproduced signal of a 3T mark having a mark length of approximately 0.614 $\mu$m should have an amplitude equivalent to at least 40% of that of the reproduced signal of the 14T mark. Assuming that the reproduced signal level of the unrecorded portions is 100% in the case of a disk yielding the smallest reproduced signal, the amplitude of the reproduced signal of the 3T mark is 43%×40%≈17%. If a phase change optical disk is capable of yielding at least 17% as the reproduced signal amplitude of the shortest 3T mark when a laser beam having a wavelength of approximately 650 nm and a lens having a numerical aperture of 0.6, information reproduction processing of the phase change optical disk can be conducted by using a drive for DVD-RAM.

For compiling and preserving data recorded on a DVD-ROM disk, a capacity nearly equivalent to that of the DVD-ROM disk or a capacity exceeding that is needed. However, the user capacity of an optical disk for DVD-RAM conforming to the above described draft of specifications is 2.6 GB/surface, which is approximately half of the capacity 4.7 GB/surface of the DVD-ROM. Therefore, the optical disk for DVD-RAM conforming to the draft of specifications is insufficient in capacity. It thus becomes difficult to compile and preserve various data including data recorded on the DVD-ROM disk.

SUMMARY OF THE INVENTION

An object of the present invention is to provide a phase change optical disk medium which has a capacity larger than that of the DVD-RAM conforming to the above described draft of specifications, and which has a performance suitable for test conditions of optical disks stated in the draft of specifications of optical disks for DVD-RAM and thereby which can be subjected to reproduction processing even in a DVD-RAM drive now under development.

Another object of the present invention is to provide a phase change optical disk medium having a user capacity of 4.7 GB/surface equivalent to that of the DVD-ROM or having a larger capacity.

In accordance with a first aspect of the present invention, the above described objects are achieved by a phase change optical disk medium including a disklike substrate and a recording layer formed by a laminate of a plurality of thin layers including a phase change layer, information marks being recorded on the phase change layer by phase changes from a crystal phase to an amorphous phase and vice versa, tracks for recording information marks in groove portions and land portions being formed on the recording layer so as to take a grooved shape having concave portions that alternate with convex portions, wherein the tracks have an interval in the range of 0.54 to 0.64 $\mu$m, and wherein the recording layer has a ratio of the optical reflectance of 0.35 or less when the phase change layer has changed to the amorphous phase in case where the optical reflectance of the recording layer is 1 when the phase change layer is in the crystal phase.

In accordance with a second aspect of the present invention, the tracks have an interval of approximately 0.59 $\mu$m and the recording layer has a ratio of optical reflectance of approximately 0.2 or less when the phase change layer has changed to the amorphous phase in the case where an optical reflectance of the recording layer is 1 when the phase change layer is in the crystal phase.

In accordance with a third aspect of the present invention, the recording layer has a ratio of optical reflectance of approximately 0.1 or less when the phase change layer has changed to the amorphous phase in the case where an optical reflectance of the recording layer is 1 when the phase change layer is in the crystal phase.

DESCRIPTION OF THE PREFERRED EMBODIMENTS

Hereafter, an embodiment of the present invention will be described by referring to FIGS. 1 to 5.

Figure 1:
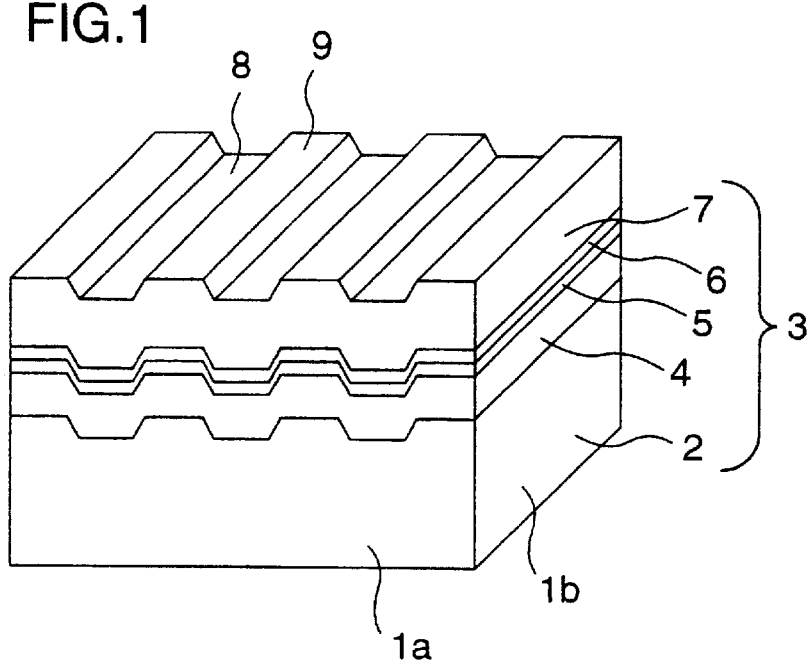
FIG. 1 is a sectional view of an optical disk medium according to the present invention.

FIG. 1 is an oblique view of section of a portion of a phase change optical disk medium according to the present invention in order to that shows the structure of the phase change optical disk medium. Reference character 1a denotes a section of the optical disk in the radial direction, and 1b denotes a section of the optical disk in the tangential direction. Numeral 2 denotes an optically transparent substrate made of polycarbonate or glass and having a thickness of approximately 0.6 mm. A recording layer 3 includes a lower interference layer 4 made of a dielectric, a phase change layer 5 for recording information marks by phase changes from the crystal phase to the amorphous phase and vice versa, an upper interference layer 6 such as a dielectric, and a reflecting layer 7 containing aluminum as its principal ingredient. The recording layer 3 has a thickness of several hundreds nm. As shown in the section 1a of the radial direction, a grooved shape having concave portions that alternate with convex portions is formed on the substrate 2 beforehand so that each groove will have a width nearly equal to that of each land portion. The lower interference layer 4, the phase change layer 5, the upper interference layer 6, and the reflecting layer 7 are formed by evaporation in the cited order. As a result, the recording layer 3 takes the same shape as that of the surface of the substrate 2. The known land/groove structure can be thus formed. Numeral 8 denotes a groove portion, and numeral 9 denotes a land portion. Each groove portion has a width nearly equal to that of each land portion. Both the groove portions and land portions serve as tracks.

Figure 2:
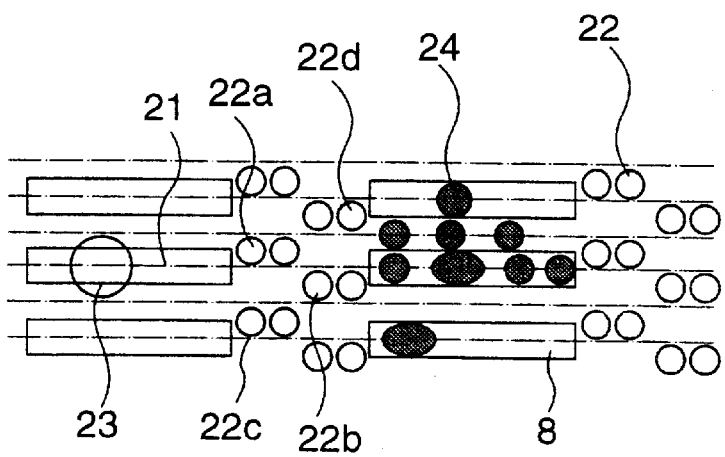
FIG. 2 is a top view showing an enlarged view of a part of an optical disk medium according to the present invention.

FIG. 2 is a top view showing an enlarged view of a part of surface of a phase change optical disk according to the present invention. A rectangle denoted by 8 is a groove shown in FIG. 1. Broken lines 21 located on the groove portions 8 and between the groove portions represent tracks for recording information. The tracks have a pitch equivalent to half of each of the intervals of the groove portions 8. Along the tracks 21 and between the groove portions 8, prepits represented by circles 22 and having an uneven shape are formed beforehand and used to record address information and the like. Numeral 23 denotes an optical spot for recording/reproducing information illuminated from an optical head of an optical disk device. Each of the intervals of the prepits 22 in a direction perpendicular to the tracks 21 is equal to the interval of the groove portions 8. However, center positions of the prepits 22 are disposed so as to be displaced from the tracks 21 by half of the track pitch. By thus displacing the center positions alternately, it can be determined whether the track under scanning with optical spot 23 is located in a groove portion 8 or a land portion 9 as stated in the draft of specifications of optical disks for DVD-RAM. Shaded circles or ellipses 24 represent recorded information marks.

Operation of the present invention will now be described. When the optical spot 23 shown in FIG. 2 scans on the prepits 22a and prepits 22b along the track 21, there is a possibility of cross-talk being caused by prepits 22c and prepits 22d. The prepits 22 have a width close to or smaller than the interval of the tracks 21. On the other hand, the optical spot 23 has a diameter $\phi$ represented as $\phi=\lambda/NA$, where $\lambda$ is the wavelength of the laser beam, and NA is the numerical aperture of the lens for focusing the laser beam. If $\lambda=0.65$ μm and NA=0.6, then $\phi=1.08$ μm. If the track pitch is at least half of the optical spot diameter $\phi$, i.e., at least 0.54 μm, the cross-talk can be prevented. A disk according to the draft of specifications of optical disks for DVD-RAM has a track pitch of 0.74 μm, a shortest mark length of 0.614 μm, and a user capacity of 2.6 GB/surface. On the other hand, the capacity of the DVD-ROM (4.7 GB/surface) is equal to 1.81 times a 2.6 GB/surface. If the track pitch is reduced from 0.74 μm to 0.54 μm, therefore, the density is increased to $0.74/0.54 \leqsim 1.37$ times. If the shortest mark length is set equal to $0.614/1.81 \times 1.37 \leqsim 0.46$ μm, therefore, the user capacity becomes 4.7 GB/surface. Therefore, the minimum value of the track pitch is 0.54 μm, and the maximum value of the mark length of the shortest mark is 0.46 μM. By manufacturing a DVD-RAM of such specifications, a recording capacity equivalent to that of the DVD-ROM can be obtained.

Figure 3:
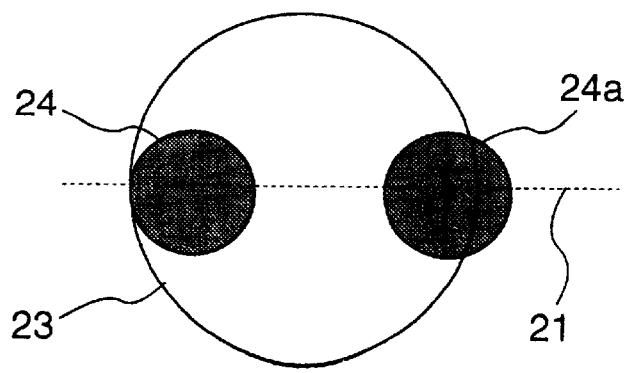
FIG. 3 is a diagram for explaining sizes of an optical spot and information marks.

FIG. 3 is a diagram illustrating the size relation between the optical spot and information marks. Even if an information mark 24 and approximately ¾ of the next information mark 24a are mixed with in the optical spot 23 when a repetition pattern of the shortest marks recorded on the track 21 is reproduced, the influence of the next information mark 24a mixed in the reproduced signal can be removed by using a known waveform equalizing circuit. As for the mark length of the shortest mark, therefore, 1/2.75 times the optical spot diameter $\phi=1.08$ μm, i.e., approximately 0.39 μm is its minimum value. If the shortest mark length is reduced from 0.614 μm to 0.39 μm, the density is increased to $0.614/0.39 \leqsim 1.57$ times. If the track pitch is set equal to $0.74/1.81 \times 1.57 \leqsim 0.64$ μm, therefore, the user capacity becomes 4.7 GB/face. Therefore, the maximum value of the track pitch is 0.64 μm, and the minimum value of the mark length of the shortest mark is 0.39 μm.

Figure 4:
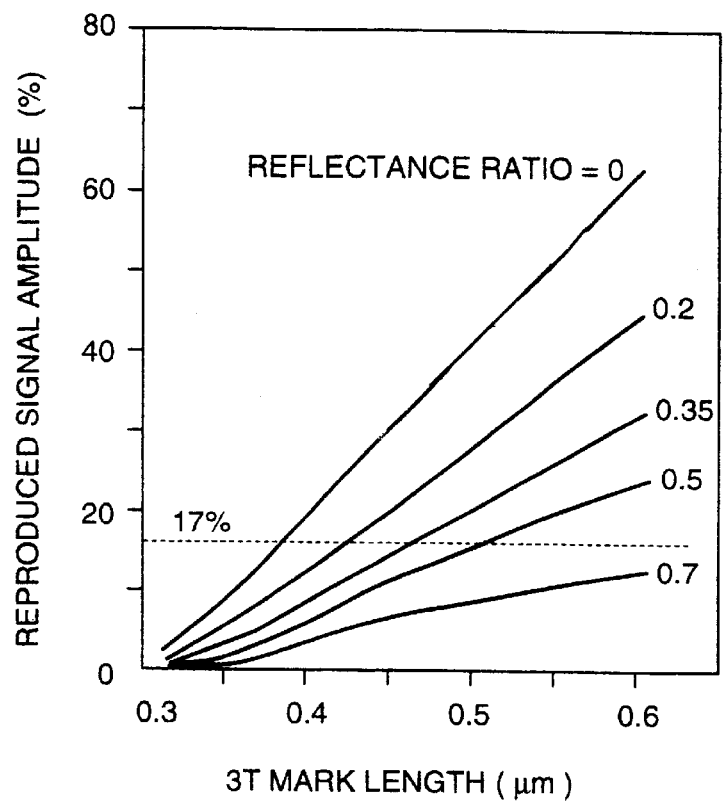
FIG. 4 is a diagram showing the reproduced signal amplitude of 3T marks.

FIG. 4 shows a result of calculation of the reproduced signal amplitude of the shortest mark, i.e., the 3T mark. The abscissa represents the mark length of the 3T mark. The ordinate represents the reproduced signal amplitude when the quantity of light reflected in the unrecorded region is taken as 100%. Assuming that the reflectance outside the 3T mark was 1, a reflectance ratio within the 3T mark was set equal to 0, 0.2, 0.35, 0.5 and 0.7. Five curves represent the calculation results for these reflectance ratios, respectively. In the case where the 3T mark length is 0.46 μm, the reproduced signal amplitude becomes at least 17% when the reflectance ratio is 0.35 or less. In the case where the 3T mark length is 0.39 μm, the reproduced signal amplitude becomes at least 17% when the reflectance ratio is approximately 0. As described before, information reproduction processing of a phase change optical disk can be conducted by using a well-known drive for DVD-RAM, if the phase change optical disk is capable of yielding at least 17% as the reproduced signal amplitude of the shortest 3T mark. Therefore, the reflectance ratio should be in the range of 0 to 0.35.

Figure 5:
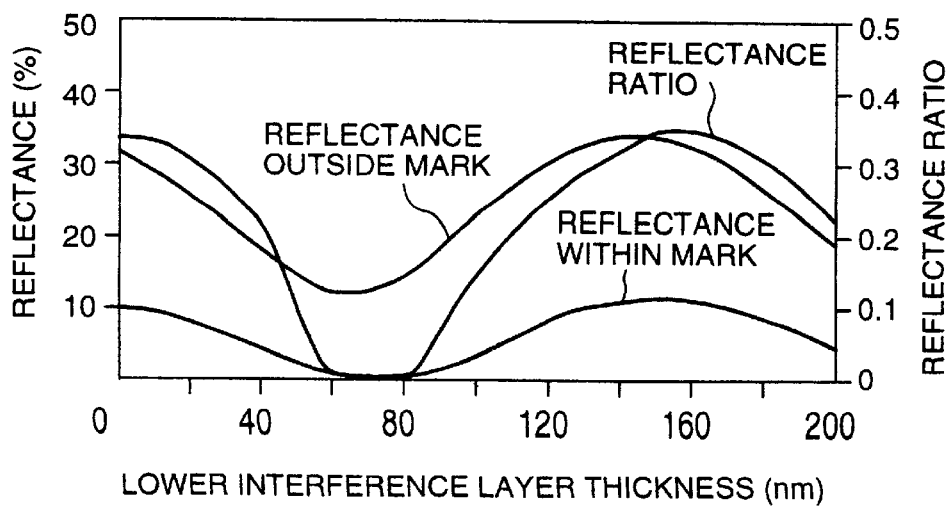
FIG. 5 is a diagram showing dependence of reflectance upon a lower interference layer.

A concrete example of the recording layer implementing the above described reflectance ratio will now be described. FIG. 5 shows a result of calculation of the reflectance of the recording layer 3 with the thickness of the lower interference layer 4 being changed. As for the configuration of the recording layer 3, the lower interference layer 4 is made of ZnS-SiO$_2$ and has a complex refractive index of 2.14–0i. The phase change layer 5 is made of GeSbTe, and has a layer thickness of 18 nm, a complex refractive index of 4.59–3.72i in the crystal phase, and a complex refractive index of 4.2–2.0i in the amorphous phase. The upper interference layer 6 is made of ZnS—SiO$_2$, and has a layer thickness of 20 nm and a complex refractive index of 2.14–0i. The reflecting layer 7 is made of Al, and has a layer thickness of approximately 100 to 200 nm and a complex refractive index of 1.67–3.45i. The substrate 2 is made of polycarbonate having a thickness of 0.6 mm, and has a complex refractive index of 1.58–0i. The reflectance ratio is a numerical value obtained by dividing the reflectance within the mark by the reflectance outside the mark. By changing the thickness of the lower interference layer 4, the reflectance ratio can be arbitrarily set in the range of 0 to approximately 0.35. The reflectance ratio can also be arbitrarily set in the same way by changing the thickness of the upper interference layer 6 instead of the lower interference layer 4.

In the present embodiment heretofore described, the reflectance ratio can be arbitrarily set in the range of 0 to 0.35 with the track pitch in the range of 0.54 to 0.64 μm and the mark length of the shortest mark, i.e., the 3T mark in the range of 0.39 to 0.46 μm. Therefore, it is possible to implement such a phase change disk medium that the user capacity is in the range of 4.0 to 5.4 GB/surface centering around 4.7 GB/surface and information processing can be conducted by using a well known DVD-RAM drive.

Especially for a phase change optical disk medium having a user capacity of approximately 4.7 GB/surface, a track pitch of approximately 0.59 μm is optimum. Because the length of the shortest 3T mark becomes approximately 0.42 μm, and both the track pitches and the pit pitches can be provided with higher densities to the same degree, resulting in implementation of a properly balanced optical disk system. In this case, since the length of the 3T mark is approximately 0.42 μm, the reflectance ratio should be 0.2 or less by referring to FIG. 4. As for the structure of the recording layer implementing this, the thickness of the lower interference layer 4 should be in the range of approximately 45 nm to approximately 110 nm by referring to FIG. 5. Alternatively, the thickness of the upper interference layer 6 may be changed in the range of approximately 45 nm to approximately 110 nm instead of the lower interference layer 4.

According to the embodiment heretofore described, a phase change optical disk medium having a user capacity of approximately 4.7 GB/surface and a properly balanced optical disk system can be implemented by setting the track pitch equal to approximately 0.59 μm and setting the reflectance ratio equal to 0.2 or less.

The track pitch, the shortest mark length, and the reflectance ratio of the present invention determined as described above can be applied also to a phase change optical medium disk medium formed so that the groove portions and the land portions may wobble in the radial direction. Such a phase change optical disk medium is described, for example, in U.S. patent application Ser. No. 08/900,294 filed Jul. 25, 1997, by H. Miyamoto, et al., entitled "Information Recording Medium and Method and Apparatus for Recording and Reproducing Information Using the Same."

Although not especially mentioned in the foregoing description, recording of an information mark sometimes causes a phase difference between reflected light within the mark and reflected light outside the mark. If a phase difference is caused, there is a possibility of reduction in the cross-talk cancel effect provided by the land/groove structure and/or occurrence of offset in track deviation detection signal. In the configuration of the recording layer of the present embodiment, the thickness range of the lower interference layer yielding the optimum reflectance ratio is wide as described before with reference to FIG. 5, and consequently it is possible to set such a thickness as not to cause a phase difference. In other recording layer configurations, however, both the condition that the optimum reflectance ratio is obtained and the condition that a phase difference is not caused cannot be simultaneously satisfied in some cases. If the reflectance ratio is 0.1 or less in such a case, the light intensity is low and consequently interference is not caused even if a phase difference occurs in light within the mark.

The embodiment has been described assuming that the disk is a single plate disk. However, the disk may have a disk structure formed by sticking two disks together. Furthermore, the thickness of the substrate 2 may be different from 0.6 mm. For example, the substrate 2 may be as thick as 1.2 mm, or may be thinner than 0.6 mm. Furthermore, the configuration of the recording layer 3 is not restricted to the present embodiment, but the recording layer may have any configuration as long as a predetermined reflectance ratio is obtained.

In the embodiment, the reflectance ratio was set by changing the thickness of the lower interference layer 4. However, the reflectance ratio depends upon the relative or absolute thickness and refractive index of the reflecting layer 7, upper interference layer 6, lower interference layer 4, and the phase change layer 5. It is expected that the thickness range providing the above described predetermined reflectance ratio is narrow depending upon the materials of respective layers. However, it is evident that the above described predetermined reflectance ratio may be obtained by changing their thickness and refractive index values.

What is claimed is:

1. A phase change optical disk medium including a disk-like substrate and a recording layer constituted of a plurality of lamination-thin films having a phase change film to record information marks with an amorphous phase and crystal phase changed, and having tracks formed concave-convex like grooves on said recording layer with lands and grooves arranged to record said information marks wherein, a track interval has a range from equal to or greater than 0.54 μm to equal to or less than 0.64 μm, wherein a reproduced signal amplitude of a shortest information mark recorded on said recording layer has a ratio equal to or greater than 17% of a reproduced signal amount by an optical reflectance of said recording layer when said phase change film is changed to the crystal phase state, and wherein a length of said shortest information mark is in a range of 0.39 μm to 0.46 μm.

2. A phase change optical disk according to claim 1, wherein said groove and land are formed wobbly in a radius direction.

3. A phase change optical disk medium including a disk-like substrate and a recording layer constituted of a plurality of lamination-thin films having a phase change film to record information marks with an amorphous phase and crystal phase changed, and having tracks formed concave-convex like grooves on said recording layer with lands and grooves arranged to record said information marks wherein, a reproduced signal amplitude of a shortest information mark recorded on said recording layer has a ratio equal to or greater than 17% of a reproduced signal amount by an optical reflectance of said recording layer with none-information mark recorded, and wherein a length of said shortest information mark is in a range of 0.39 µm to 0.46 µm.

4. A phase change optical disk medium according to claim 2, wherein said groove and land are formed wobbly in a radius direction.

5. A phase change optical disk medium including a recording layer having an upper interference layer, a lower interference layer, and a phase change film disposed between said upper interference layer and lower interference layer to record information marks with a crystal phase and amorphous phase changed, wherein the thickness of said upper interference layer, said lower interference layer and phase change film is of a thickness of becoming that a reproduced signal amplitude of a shortest information mark recorded on said recording layer with the phase change film stated in the crystal phase has a ratio equal to or greater than 17% of a reproduced signal amount by an optical reflectance of said recording layer with the phase change film stated in the crystal phase, and wherein a length of said shortest information mark is in a range of 0.39 µm to 0.46 µm.

6. A phase change optical disk according to claim 5, wherein a groove and land are formed wobbly in a radius direction of said phase change optical disk medium.

7. A phase change optical disk according to claim 5, wherein said recording layer are constituted of said lower interference layer, said phase change layer, said upper interference layer, and said reflecting layer, which are formed on a substrate in the order, wherein the thickness of said lower interference layer has a range from about 45 nm to 110 nm.

8. A phase change optical disk according to claim 5, wherein said recording layer are constituted of said lower interference layer, said phase change layer, said upper interference layer and said reflecting layer, which are formed on a substrate in the order, wherein the thickness of said upper interference layer has a range from about 45 nm to 110 nm.

9. A phase change optical disk medium including a recording layer having an upper interference layer, a lower interference layer, and a phase change film disposed between said upper interference layer and lower interference layer to record information marks with a crystal phase and amorphous phase changed, wherein a reproduced signal amplitude obtained at a state in recording a shortest information mark recorded on said phase change film has a ratio equal to or greater than 17% of a reproduced signal amount obtained at a state with none-information mark recorded, and wherein a length of said shortest information mark is in a range of 0.39 µm to 0.46 µm.

10. A phase change optical disk according to claim 9, wherein a groove and land are formed wobbly in a radius direction of said phase change optical disk medium.

11. A phase change optical disk according to claim 9, wherein said recording layer are constituted of said lower interference layer, said phase change layer, said upper interference layer, and said reflecting layer, which are formed on a substrate in the order, wherein the thickness of said lower interference layer has a range from about 45 nm to 110 nm.

12. A phase change optical disk according to claim 9, wherein said recording layer are constituted of said lower interference layer, said phase change layer, said upper interference layer and said reflecting layer, which are formed on a substrate in the order, wherein the thickness of said upper interference layer has a range from about 45 nm to 110 nm.

13. A phase change optical disk medium including a recording layer having a reflecting layer, an upper interference layer, a phase change film recorded information marks with a crystal phase and amorphous phase changed and a lower interference layer, which are laminated in the order, wherein the thickness of said upper interference layer, said lower interference layer and phase change film is of a thickness of becoming that a reproduced signal amplitude of a shortest information mark recorded on said recording layer with the phase change film stated in the crystal phase has a ratio equal to or greater than 17% of a reproduced signal amount by an optical reflectance of said recording layer with the phase change film stated in the crystal phase, and wherein a length of said shortest information mark is in a range of 0.39 µm to 0.46 µm.

14. A phase change optical disk according to claim 13, wherein a groove and land are formed wobbly in a radius direction of said phase change optical disk medium.

15. A phase change optical disk according to claim 13, wherein said recording layer are constituted of said lower interference layer, said phase change layer, said upper interference layer and said reflecting layer, which are formed on a substrate in the order, wherein the thickness of said lower interference layer has a range from about 45 nm to 110 nm.

16. A phase change optical disk according to claim 13, wherein said recording layer are constituted of said lower interference layer, said phase change layer, said upper interference layer and said reflecting layer, which are formed on a substrate in the order, wherein the thickness of said upper interference layer has a range from about 45 nm to 110 nm.

17. A phase change optical disk medium including a recording layer having a reflecting layer, an upper interference layer, a phase change film recording information marks with a crystal phase and amorphous phase changed and a lower interference layer, which are laminated in the order, wherein a reproduced signal amplitude obtained at a state in recording a shortest information mark recorded on said phase change film has a ratio equal to or greater than 17% of a reproduced signal amount obtained at a state with none-information mark recorded, and wherein a length of said shortest information mark is in a range of 0.39 µm to 0.46 µm.

18. A phase change optical disk according to claim 17, wherein a groove and land are formed wobbly in a radius direction of said phase change optical disk medium.

19. A phase change optical disk according to claim 17, wherein said recording layer are constituted of said lower interference layer, said phase change layer, said upper interference layer and said reflecting layer, which are formed on a substrate in the order, wherein the thickness of said lower interference layer has a range from about 45 nm to 110 nm.

20. A phase change optical disk according to claim 17, wherein said recording layer are constituted of said lower interference layer, said phase change layer, said upper interference layer and said reflecting layer, which are formed on a substrate in the order, wherein the thickness of said upper interference layer has a range from about 45 nm to 110 nm.

* * * * *